United States Patent
Chang et al.

(10) Patent No.: US 9,530,177 B2
(45) Date of Patent: Dec. 27, 2016

(54) LAYER ACCESS METHOD, DATA ACCESS DEVICE AND LAYER ACCESS ARRANGEMENT METHOD

(71) Applicant: MStar Semiconductor, Inc., Hsinchu Hsien (TW)

(72) Inventors: Chih-Hao Chang, Zhubei (TW); Cheng-Yu Hsieh, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 339 days.

(21) Appl. No.: 14/275,967

(22) Filed: May 13, 2014

(65) Prior Publication Data
US 2014/0340413 A1  Nov. 20, 2014

(30) Foreign Application Priority Data

May 14, 2013 (TW) .............................. 102117065 A

(51) Int. Cl.
*G06T 1/60* (2006.01)
*G09G 5/397* (2006.01)
*G09G 5/14* (2006.01)

(52) U.S. Cl.
CPC . *G06T 1/60* (2013.01); *G09G 5/14* (2013.01); *G09G 5/397* (2013.01); *G09G 2340/12* (2013.01); *G09G 2350/00* (2013.01)

(58) Field of Classification Search
None
See application file for complete search history.

(56) References Cited

U.S. PATENT DOCUMENTS

| | | | | |
|---|---|---|---|---|
| 5,748,174 A | * | 5/1998 | Wong | G09G 5/42 345/683 |
| 6,008,820 A | * | 12/1999 | Chauvin | G06T 11/40 345/502 |
| 6,069,633 A | * | 5/2000 | Apparao | G06T 15/405 345/421 |
| 7,106,275 B2 | * | 9/2006 | Brunner | G06T 15/40 345/32 |

(Continued)

FOREIGN PATENT DOCUMENTS

| TW | 200842637 A | 11/2008 |
|---|---|---|
| TW | 201011684 A | 3/2010 |

OTHER PUBLICATIONS

Dr. Math, "Math Forum—Ask Dr. Math", [online], [retrieved May 7, 2016], http://mathforum.org/library/drmath/63334.html, 2003.*

*Primary Examiner* — Ulka Chauhan
*Assistant Examiner* — Patrick F Valdez
(74) *Attorney, Agent, or Firm* — Edell, Shapiro & Finnan, LLC

(57) ABSTRACT

A data access method is provided. The data access method is applied for a data device access device to access data from N layers to display an image, where N is a positive integer. Each of the N layers includes a horizontal start point, a horizontal end point, a vertical start point and a vertical end point. The data access method includes: dividing the image into a plurality of regions according to the horizontal start points, the horizontal end points, the vertical start points and the vertical end points, wherein the regions respectively correspond to the N layers; and accessing data from the respective layers corresponding to the regions when displaying the image.

16 Claims, 7 Drawing Sheets

(56) References Cited

U.S. PATENT DOCUMENTS

| | | | |
|---|---|---|---|
| 2003/0128224 A1* | 7/2003 | Smith | G06T 11/60 345/619 |
| 2005/0206653 A1* | 9/2005 | Beaumont | G06T 11/40 345/629 |
| 2007/0019888 A1* | 1/2007 | Larking | G06T 11/60 382/302 |
| 2010/0058229 A1* | 3/2010 | Mercer | G06F 9/4443 715/788 |
| 2010/0079489 A1* | 4/2010 | Cheng | G06T 15/503 345/629 |
| 2012/0026179 A1* | 2/2012 | Funakubo | G09G 5/39 345/536 |
| 2012/0163732 A1* | 6/2012 | Hoshino | G06T 3/40 382/284 |

* cited by examiner ant application Serial No. 102117065, filed May 14, 2013, the subject matter of which is incorporated herein by reference.

LAYER ACCESS METHOD, DATA ACCESS DEVICE AND LAYER ACCESS ARRANGEMENT METHOD

This application claims the benefit of Taiwan application Serial No. 102117065, filed May 14, 2013, the subject matter of which is incorporated herein by reference.

BACKGROUND OF THE INVENTION

Field of the Invention

The invention relates in general to a layer access method, a data access device and a layer access arrangement method, and more particularly to a layer access method, a data access device and a layer access arrangement method that are capable of saving a bandwidth and/or enhancing operating performance.

Description of the Related Art

One's daily life involves various kinds of display devices. For example, one watches television, and uses a mobile phone for communications and a tablet computer for internet access. Accompanied with progresses in multimedia display technologies as well as changes in commercial modes and viewing habits, a same display image may simultaneously include graphics and messages from many different sources. For example, apart from displaying a moving or still image background, a display image may at the same time display moving or still subtitles, diagrams, advertisements or operation interfaces. Since the graphics and messages are from different sources, a data access device is required for accessing required contents from these different sources, and the graphics and messages from these different sources are superimposed on the image background according to a predetermined display sequence. The superimposed image is then displayed on a display panel.

As shown in FIG. 1, assume that a non-rectangular diagram 122 is to be displayed on a background image 110. In a current technique, a corresponding rectangular diagram 120 (including the non-rectangular diagram 122 to be displayed and non-necessary information 124 that need not be displayed) is loaded according to horizontal and vertical start positions (x_st, y_st) and end positions (x_end, y_end) of the non-rectangular diagram 122, and is superimposed onto the background image 110 for display. As such, a large bandwidth may be wasted in loading the non-necessary information and performance is thus reduced. As shown in FIG. 2, assume that a plurality of overlapping diagrams such as a first rectangular diagram 220 and a second rectangular diagram 230 are to be displayed on a background image 210. In a current technique, contents of the first rectangular diagram 220 having a lower display sequence are loaded according to horizontal and vertical start positions (x_st_1, y_st_1) and horizontal and vertical end positions (x_end_1, y_end_1) of the first rectangular diagram 220, and are superimposed onto the background image 210. Next, contents of the second rectangular diagram 230 having a higher display sequence are loaded according to horizontal and vertical start positions (x_st_2, y_st_2) and horizontal and vertical end positions (x_end_2, y_end_2) of the second rectangular diagram 230, and are superimposed onto the first rectangular diagram 220 and the background image 210. As heights of the two rectangular diagrams 220 and 230 overlap, most of the contents of the first rectangular diagram 220 having a lower display sequence are not displayed. The loading procedure of the data that is not displayed results in a bandwidth waste and reduced performance. Further, again referring to FIG. 2, assume that, in a unit of pixels, it is determined whether each pixel position on the background image is to be utilized for displaying pixels of another diagram source. In a current technique, horizontal and vertical positions (x, y) of each pixel position are compared with the horizontal and vertical start positions (x_st_1, y_st_1) and (x_st_2, y_st_2) as well as the horizontal and vertical end positions (x_end_1, y_end_1) and (x_end_2, y_end_2) of the two rectangular diagrams 220 and 230, so as to determine whether the position (x, y) of each pixel falls within ranges covered by the two rectangular diagrams 220 and 230 to further confirm whether the position (x, y) is to display contents included in the two rectangular diagrams 220 and 230. However, such approach performs the above comparison in a unit of pixels, and thus consumes a large portion of computation performance and expends great hardware costs. More particularly, the number of comparisons to be carried out correspondingly increases by a large scale when the quantity of source images gets larger, leading to immense performance and cost consumption.

In view of the above issues of bandwidth waste and unsatisfactory performance as well as the expanding demand of multi-image display, there is a need for an efficient solution that overcomes the drawbacks of the prior art.

SUMMARY OF THE INVENTION

The invention is directed to a layer access method, a data access device and a layer access arrangement method for overcoming issues of the prior art.

The present invention discloses a layer access method for a data access device to access data from N layers to display an image, where N is a positive integer. Each of the N layers includes a horizontal start point, a horizontal end point, a vertical start point and a vertical end point. According to an embodiment, the method includes: dividing the image into a plurality of regions according to the horizontal start points, the horizontal end points, the vertical start points and the vertical end points, wherein the regions respectively correspond to the layers; and accessing data from the respective layers corresponding to the regions when displaying the image.

The present invention further discloses a data access device for accessing data from N layers to display an image, where N is a positive integer. The N layers are stored in a storage device. Each of the N layers includes a horizontal start point, a horizontal end point, a vertical start point and a vertical end point. According to an embodiment, the device includes: a processor, coupled to the storage device and configured to perform a plurality of steps. The steps include: dividing the image into a plurality of regions according to the N horizontal start points, the N horizontal end points, the N vertical start points and the N vertical end points, wherein the regions respectively correspond to the layers; and accessing data from the respective layers corresponding to the regions when displaying the image.

The present invention further discloses a layer access arrangement method for a data device to access data from N layers to display an image, where N is a positive integer. The method is suitable to be implemented by software stored in a memory, and is performed by the data access device. Each of the N layers includes a horizontal start point, a horizontal end point, a vertical start point and a vertical end point. According to an embodiment, the method includes: dividing the image into a plurality of regions according to the horizontal start points, the horizontal end points, the vertical start points and the vertical end points, wherein the regions respectively correspond to the layers. A corresponding relationship between the regions and the layers is for the data access device to access data from the respective layers corresponding to the regions when displaying the image.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application.

A layer access arrangement method, a layer access method and a data access device are disclosed by the present invention. The methods and device determine data of a layer or layers to be accessed according to vertical start and end points as well as horizontal start and end points of one or multiple layers to achieve a universal and efficiency layer access process. The methods and device of the present invention are applicable to an image processing device, e.g., a television image processing device, a monitor image processing device, or a mobile device image processing device. In possible implementation, one skilled person in the art may choose equivalent elements or steps to implement the disclosure based on the disclosure of the application. That is, the implementation of the disclosure is not limited by the embodiments disclosed in the disclosure. Further, the layer access arrangement method and the layer access method may be realized by the data access device of the present invention or by other data access devices. Without affecting full disclosure and possible implementation of the methods, the description of the methods of the present invention focus on the methods instead of on details of hardware devices. Similarly, a part or all of the elements of the data access device of the present invention may be individually known elements. Without affecting full disclosure and possible implementation of the device of the present invention, details of the individual known elements are omitted.

Figure 1:
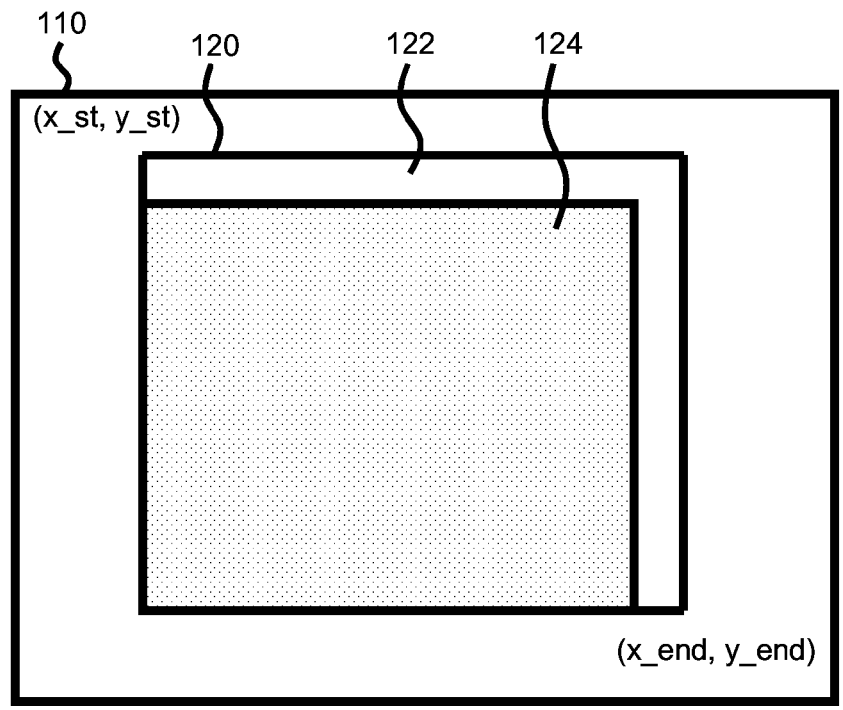
FIG. 1 is a schematic diagram of a layer loading method of the prior art.
Figure 2:
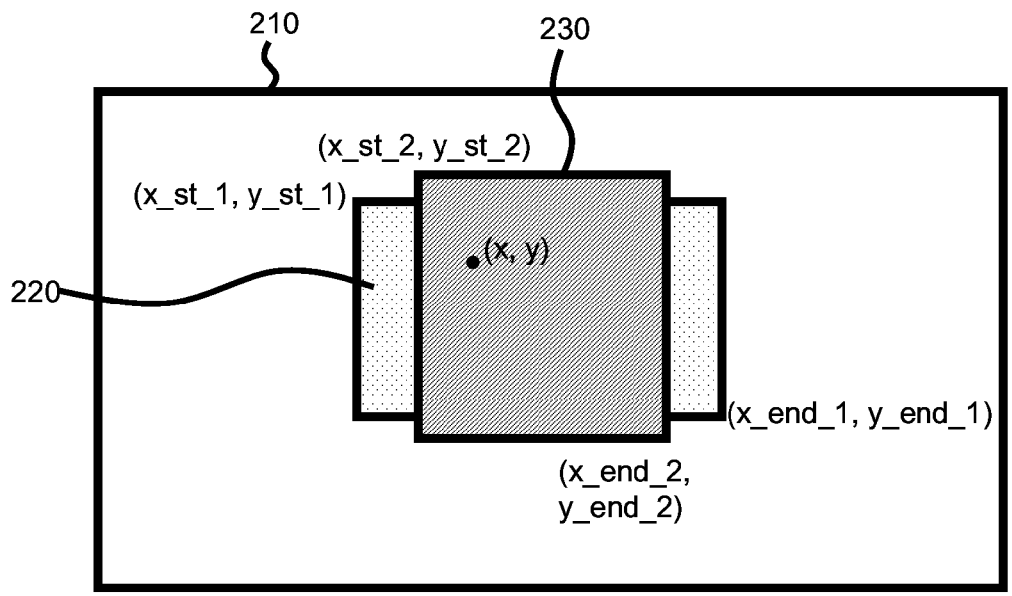
FIG. 2 is another schematic diagram of a layer loading method of the prior art.
Figure 3A:
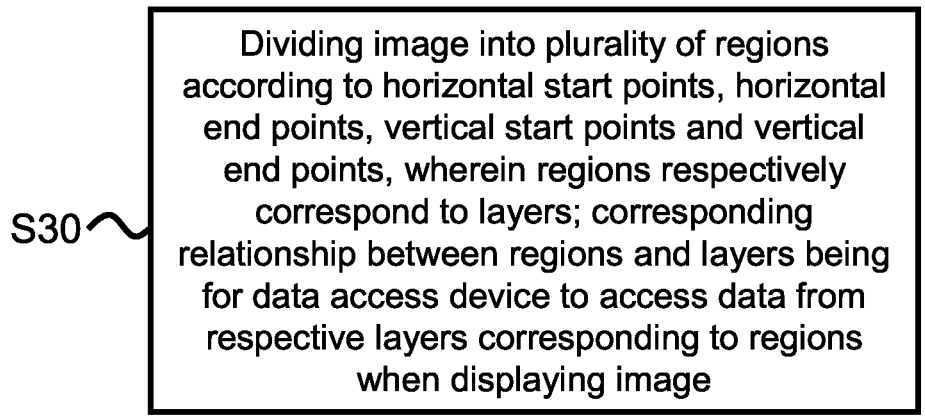
FIG. 3a is a schematic diagram of a layer access arrangement method according to an embodiment of the present invention.

FIG. 3a shows a schematic diagram of a layer access arrangement method according to an embodiment of the present invention. The embodiment may be implemented by firmware, which refers to software stored in a memory (e.g., a non-volatile memory), and is readable by a data access device that accordingly determines at least a part of data of N layers (where N is a positive integer). Each of the N layers includes a horizontal start point, a horizontal end point, a vertical start point and a vertical end point. Referring to FIG. 3a, the layer access arrangement method according to an embodiment includes the following steps.

In step S30, an image is divided into a plurality of regions according to the horizontal start points, the horizontal end points, the vertical start points and the vertical end points. The regions respectively correspond to the layers. A corresponding relationship between the regions and the layers is for the data access device to access data from the respective layers corresponding to the regions when displaying the image.

Figure 3B:
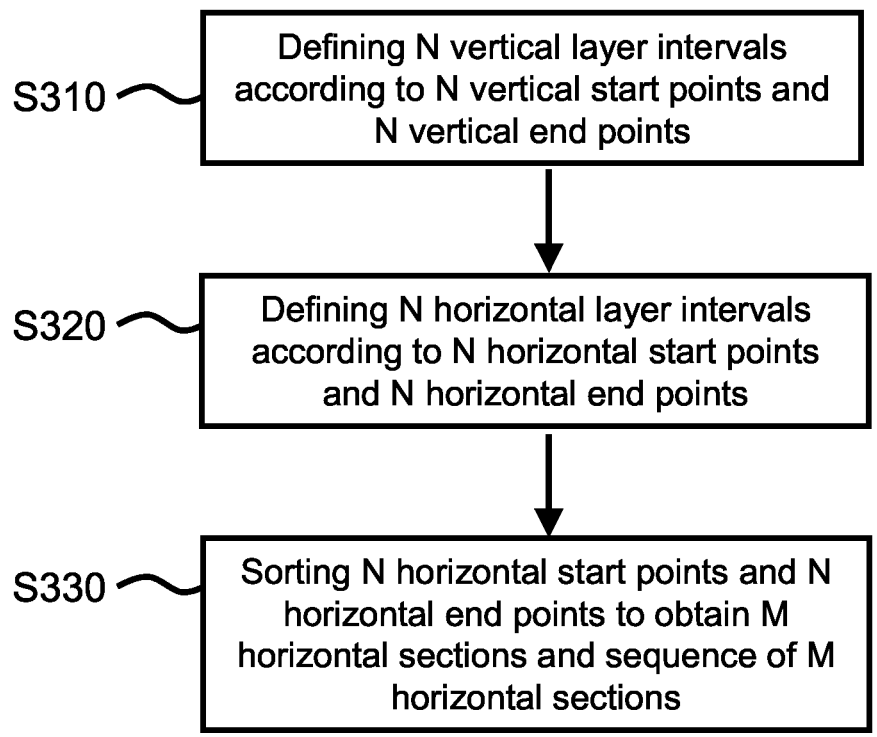
FIG. 3b is a schematic diagram of an application example of FIG. 3b.

FIG. 3b shows a schematic diagram of an example of FIG. 3a according to an embodiment. As shown in FIG. 3b, step S30 may include the following steps.

Figure 4A:
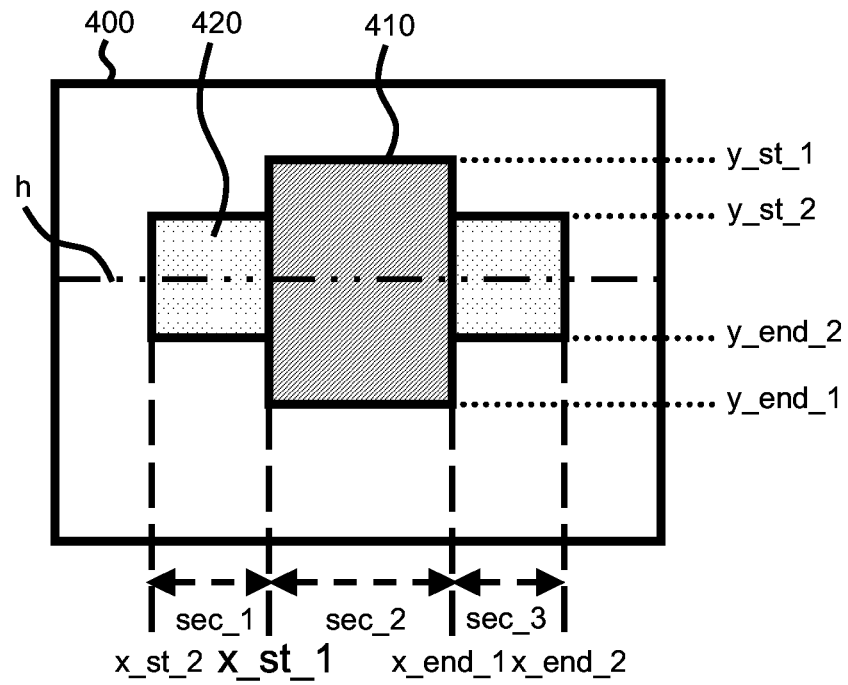
FIG. 4a and FIG. 4b are schematic diagrams of applications of FIG. 3b according to an embodiment.

In step S310, N vertical layer intervals are determined according to the N vertical start points and the N vertical end points. The vertical layer intervals respectively correspond to the N layers. In other words, the vertical start point and the horizontal start point of each layer define a vertical layer interval that defines a vertical range of the layer. For example, referring to FIG. 4a, assume that a first layer 410 and a second layer 420 (i.e., the number N of layers is equal to 2) are to be displayed on a background image 400, a vertical start point and a vertical end point of the first layer 410 are respectively y_st_1 and y_end_1, and a vertical start point and a vertical end point of the second layer 420 are respectively y_st_2 and y_end_2. In step S310, the vertical range between y_st_1 and y_end_1 is defined as a first vertical layer interval V01, and the vertical range between y_st_2 and y_end_2 is defined as a second vertical layer interval V02.

In step S320, N horizontal layer intervals are defined according to the N horizontal start points and the N horizontal end points. The horizontal layer intervals respectively correspond to the N layers. In other words, the horizontal start point and the horizontal end point of each layer define a horizontal range of the layer. For example, referring to FIG. 4a, assume that the horizontal start point and the horizontal end point of the first layer 410 are respectively x_st_1 and x_end_1, and the horizontal start point and the horizontal end point of the second layer 420 are respectively x_st_2 and x_end_2. In step S320, the horizontal range between x_st_1 and x_end_1 is defined as a first horizontal layer interval H01, and the horizontal range between x_st_2 and x_end_2 is defined as a second horizontal layer interval H02.

In step S330, the N horizontal start points and the N horizontal end points are sorted to obtain M horizontal sections and a sequence of the M horizontal sections, where M is a positive integer not greater than (2×N−1). For example, referring to FIG. 4a, three horizontal sections in the sequence below are obtained according to the horizontal start points and horizontal end points: a first horizontal section sec_1 from x_st_2 to x_st_1, a second horizontal section sec_2 from x_st_1 to x_end_1, and a third horizontal section sec_3 from x_end_1 to x_end_2.

In the steps in FIG. 3b, the N vertical layer intervals are of the data access device to determine whether a vertical position of a horizontal scan line is located in one of the N vertical layer intervals. If so, it means that the contents of at least one pixel of the horizontal scan line need to be accessed from one of the N layers. At this point, the sequence of the M horizontal sections are for the data access device to sequentially determine in which of the N horizontal intervals a horizontal position of the scan line in each horizontal section is located to generate a determination result, according to which the data access device accesses data from one of the N layers. For example, referring to FIG. 4a, the first and second vertical layer intervals V01 and V02 are sequentially for the data access device to determine whether a vertical position y of a horizontal scan line h falls therein. That is, the first and second vertical layer intervals V01 and V02 are for the data access device to sequentially perform at least one of the comparisons below until one comparison is satisfied or all of the comparisons are not satisfied: $y\_st\_1 \le y \le y\_end\_1$ and $y\_st\_2 \le y \le y\_end\_2$. When one of the above comparisons is satisfied, the data access determines that the contents of at least one pixel of the horizontal scan line h need to be accessed from the first layer 410 or the second layer 420. At this point, the sequence of the first to third horizontal sections is for the data access device to sequentially determine to which of the N horizontal layer intervals H01 and H02 a horizontal position x of the horizontal scan line h in each horizontal section corresponds to generate the foregoing determination result. In other words, the data access device performs at least one of the comparisons below for each of the horizontal sections until at least one of the comparisons is satisfied: $x\_st\_1 \le x \le end\_1$ (to be referred to as equation A) and $x\_st\_2 \le x \le x\_end\_2$ (to be referred to as equation B). When the determination result indicates that the horizontal position x in the first horizontal section sec_1 corresponds to the second layer 420 (i.e., when x is between x_st_2 and x_st_1, equation B is satisfied), the horizontal position x in the second horizontal section sec_2 corresponds to the first layer 410 (i.e., when x is between x_st_1 and x_end_1, equation A is satisfied), and horizontal position x in the third horizontal section sec_3 corresponds to the second layer 420 (i.e., when x is between x_end_1 and x_end_2, equation B is satisfied), the data access device sequentially accesses the data corresponding to the first horizontal section sec_1 from the second layer 420, the data corresponding to the second horizontal section sec_2 from the first layer 410, and data corresponding to the third horizontal section sec_3 from the second layer 420. Similarly, data access from more layers and data access for other horizontal scan lines can be arranged according to the above method.

Further, the N layers may include one or multiple non-rectangular layers. Therefore, before the steps in FIG. 3b, the layer access arrangement method of the present invention may include the following steps (not shown).

In step S302, it is detected whether each of the layers is a rectangle to accordingly generate a detection result.

In step S304, when the detection result indicates the N layers include Q non-rectangular layers (where Q is a positive integer), each of the non-rectangular layers is defined according to a plurality of non-overlapping rectangular layers. Each of the rectangular layers includes a horizontal start point, a horizontal end point, a vertical start point and a vertical end point.

In step S306, assuming that the total number of the rectangular layers is Z, N is updated to [(N–Q)+Z] (where Z is a positive integer greater than 1), and the steps in FIG. 3b are accordingly performed. In other words, the Z rectangular layers and the N–Q rectangular layers in the original N layers are regarded as updated N layers, and steps in FIG. 3b are performed.

Figure 4B:
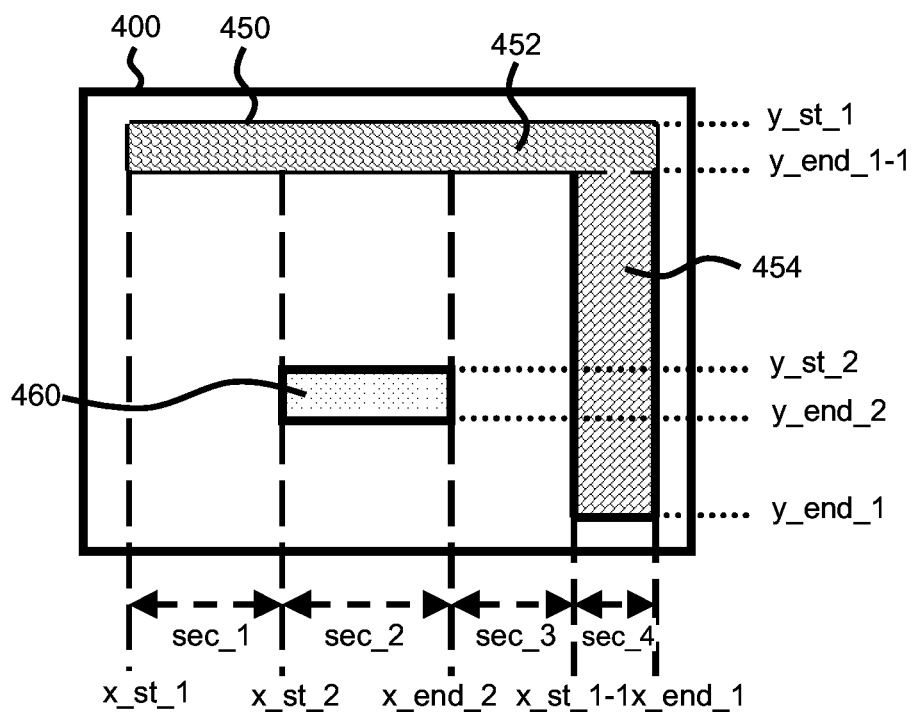

For example, referring to FIG. 4b, an L-shaped layer 450 and a rectangular layer 460 are located on a background image 400. The horizontal start point, the horizontal end point, the vertical start point and the vertical end point of the L-shaped layer 450 are x_st_1, x_end_1, y_st_1 and y_end_1, respectively. The horizontal start point, the horizontal end point, the vertical start point and the vertical end point of the rectangular layer 460 are x_st_2, x_end_2, y_st_2 and y_end_2, respectively. Thus, step S302 detects that the L-shaped layer 450 is a non-rectangle through the analysis of the predetermined layer range, pixel value or transparency, and step S304 defines the L-shaped layer 450 by utilizing rectangular layers 452 and 454. A total range of the rectangular layers 452 and 454 is not smaller than the L-shaped layer 450. The horizontal start point, the horizontal end point, the vertical start point and the vertical end point of the rectangular layer 452 are x_st_1, x_end_1, y_st_1 and y_end_1–1, respectively. The horizontal start point, the horizontal end point, the vertical start point and the vertical end point of the rectangular layer 454 are x_st_1–1, x_end_1, y_end_1–1 and y_end_1, respectively. At this point, in FIG. 4b, the original number N of layers is equal to 2, the number Q of non-rectangular layers is equal to 1, the number Z of rectangular layers is equal to 2, and thus step S306 replaces the original number N of layers by the number [(2–1)+2]=3 of all of the rectangular layers to perform the steps in FIG. 3b. In other words, in the present invention, the Q non-rectangular layers may be replaced by the Z rectangular layers, and the steps in FIG. 3b are then performed. It should be noted that, when a plurality of possible methods for defining a non-rectangular layer by utilizing a plurality of rectangular layers, one person skilled in the art may select an appropriate method according to the disclosure of the present invention. Further, three vertical layer intervals (y_st_1 to y_end_1–1, y_end_1–1 to y_end_1, and y_st_2 to y_end_2), three horizontal layer intervals (x_st_1 to x_end_1, x_st_1–1 to x_end_1, and x_st_2 to x_end_2),F and four horizontal sections (sec_1 from x_ste_1 to x_st_2, sec_2 from x_st_2 to x_end_2, sec_3 from x_end_to x_st_1–1, and sec_4 from x_st_1–1 to x_end_1) are defined in FIG. 4b according to the steps in FIG. 3b. One person skilled in the art can thoroughly understand and implement the intervals, the sections and the subsequent applications from the associated description, and such details are omitted herein.

Figure 5A:
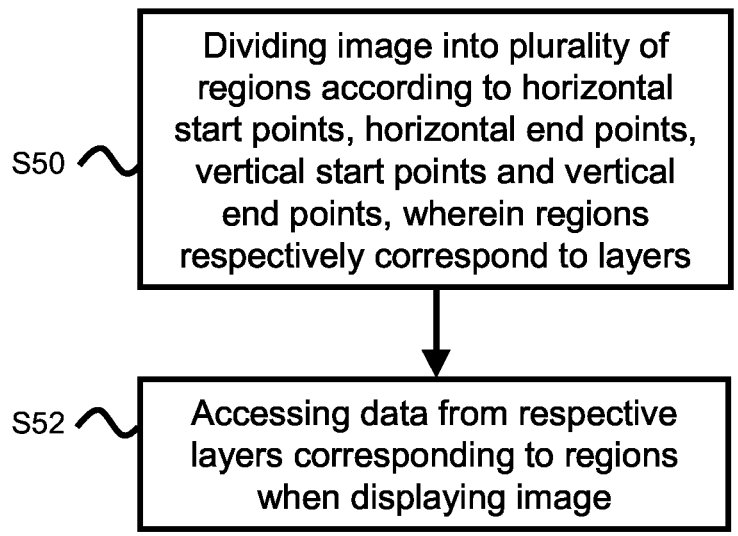
FIG. 5a is a schematic diagram of a layer access method according to an embodiment of the present invention.

Based on the layer access arrangement method of the present invention, the present invention correspondingly provides a layer access method. The layer access method is for accessing at least a part of data of N layers, and may be performed by a data access device. Similarly, each layer includes a horizontal start point, a horizontal end point, a vertical start point and a vertical end point. As shown in FIG. 5a, the layer access method according to an embodiment includes the following steps.

In step S50, an image is divided into a plurality of regions according to the N horizontal start points, the N horizontal end points, the N vertical start points and the N vertical end points. The regions respectively correspond to the layers.

In step S52, data is accessed from the respective layers corresponding to the regions when displaying the image.

More specifically, step S52 includes: determining in which of the regions a section of a scan line is located, and accordingly accessing data from the layer corresponding to the region. Further, the above scan line may be a horizontal scan line, and the step of determining in which of the regions the section of the scan line is located includes: sorting the N horizontal start points and the N horizontal end points to obtain M horizontal sections, where M is a positive integer not greater than (2×N−1), the section of the scan line corresponds to one of the M horizontal sections, and the horizontal sections respectively correspond to the regions; and determining to which of the M horizontal sections the region of the scan line corresponds to determine in which of the regions the section of the scan line is located.

Further, when the scan line is a horizontal scan line, the above layer access method may further include: a) before the step of determining in which of the regions the section of the scan line is located and accordingly accessing data from the layer corresponding to the region, defining N vertical layer intervals according to the N vertical start points and the N vertical end points, wherein the N vertical layer intervals respectively correspond to the N layers; and b) determining whether a vertical position of the scan line is located in one of the N vertical layer intervals, and, when the vertical position of the scan line is located in one of the N vertical layer intervals, determining in which of the regions the section of the scan line is located and accordingly accessing data from the layer corresponding to the region. Step (b) may further include: when the vertical position of the scan line is not located in one of the N vertical layer intervals, utilizing a next horizontal scan line as the scan line, and iterating step (b).

It should be noted that, in the disclosure, the term "region" may refer to a point, a segment or a plane in an image, and the term "section" of a scan line may refer to a point or a segment in an image.

The N vertical start points and the N vertical end points of the N layers may be utilized to define the N vertical layer intervals, which respectively correspond to the N layers. Further, the N horizontal start points and the N horizontal end points of the N layers may be utilized to define the N horizontal layer intervals and the M horizontal sections. The horizontal layer intervals also respectively correspond to the N layers. Based on the above description, referring to FIG. 5*b*, step S52 according to an exemplary embodiment may include the following steps.

In step S510, it is determine whether the vertical position of a horizontal scan line is located in one of the N vertical layer intervals to accordingly determine whether the horizontal scan line overlaps with at least one of the N layers. For example, referring to FIG. 6, assume that a first layer 610, a second layer 620, a third layer 630 and a fourth layer 640 are to be displayed on a background image 600 (i.e., the number N of layers is equal to four), a vertical start point y_st_1 and a vertical end point y_end_1 of the first layer 610 define a first vertical layer interval V01, a vertical start point y_st_2 and a vertical end point y_end_2 of the second layer 620 define a second vertical layer interval V02, a vertical start point y_st_3 and a vertical end point y_end_3 of the third layer 630 define a third vertical layer interval V03, and a vertical start point y_st_4 and a vertical end point y_end_4 of the fourth layer 640 define a fourth vertical layer interval V04. Thus, step S510 determines whether a vertical position y of a horizontal scan line h falls within any of the vertical layer intervals. That is, step S510 performs at least one of the comparisons below until one comparison is satisfied or all of the comparisons are not satisfied: y_st_1≤y≤y_end_1 (to be referred to as equation I), y_st_2≤y≤y_end_2 (to be referred to as equation II), y_st_3≤y≤y_end_3 (to be referred to as equation III), and y_st_4≤y≤y_end_4 (to be referred to as equation IV).

In step S520, when it is determined that the vertical position of the horizontal scan line falls in one of the N vertical layer intervals, it is sequentially determined in which of the N horizontal layer intervals a horizontal position of the horizontal scan line of each horizontal section falls according to the sequence of the M horizontal sections to generate a determination result. For example, referring to FIG. 6, a horizontal start point x_st_1 and a horizontal end point x_end_1 of the first layer 610 define a first horizontal layer interval H01, a horizontal start point x_st_2 and a horizontal end point x_end_2 of the second layer 620 define a second horizontal layer interval H02, a horizontal start point x_st_3 and a horizontal end point x_end_3 of the third layer 630 define a third horizontal interval H03, and a horizontal start point x_st_4 and a horizontal end point x_end_4 of the fourth layer 640 define a fourth horizontal interval H04. Further, the M horizontal sections are respectively a first horizontal section sec_1 from x_st_4 to x_st_2, a second horizontal section sec_2 from x_st_2 to x_st_3, a third horizontal section sec_3 from x_st_3 to x_st_1, a fourth horizontal section sec_4 from x_st_1 to x_end_1, a fifth horizontal section sec_5 from x_end_1 to x_end_3, a sixth horizontal section sec_6 from x_end_3 to x_end_2, and a seventh horizontal section sec_7 from x_end_2 to x_end_4. Thus, step S520 may determine in which of the horizontal layer intervals a horizontal position x of a pixel of the horizontal scan line h of each horizontal section falls to generate the determination result. In other words, according to a horizontal position x in each horizontal section (the horizontal start point x_st_4, x_st_2, x_st_3, x_st_1, x_end_1, x_end_3, x_end_2 or x_end_4 of the horizontal section), step S520 performs at least one of the comparisons of x_st_1≤x≤x_end_1 (to be referred to as equation 1), x_st_2≤x≤x_end_2 (to be referred to as equation 2), x_st_3≤x≤x_end_3 (to be referred to as equation 3), and x_st_4≤x≤x_end_4 (to be referred to as equation 4), until one comparison is satisfied to accordingly generate the determination result. In step S530, data is accessed from one of the N layers according to the determination result. For example, referring to FIG. 6, when the determination result indicates that the horizontal position x in the first horizontal section sec_1 corresponds to the fourth layer 640 (i.e., equation 4 is satisfied), the horizontal position x in the second horizontal section sec_2 corresponds to the second layer 620 (i.e., equation 2 is satisfied), the horizontal position x in the third horizontal section sec_3 corresponds to the second layer 620 (i.e., equation 2 is satisfied), the horizontal position x in the fourth horizontal section sec_4 corresponds to the first layer 610 (i.e., equation 1 is satisfied), the horizontal position x in the fifth horizontal section sec_5 corresponds to the second layer 620 (i.e., equation 2 is satisfied), the horizontal position x in the sixth horizontal section sec_6 corresponds to the second layer 620 (i.e., equation 2 is satisfied), and the horizontal position x in the seventh horizontal section sec_7 corresponds to the fourth layer 640 (i.e., equation 4 is satisfied), step S530 sequentially accesses data corresponding to the first horizontal section sec_1 from the fourth layer 640, data corresponding to the second horizontal section sec_2 from the second layer 620, data corresponding to the third horizontal section sec_3 from the second layer 620, data corresponding to the fourth horizontal section sec_4 from the first layer 610, data corresponding to the fifth horizontal section sec_5 from the second layer 620, data corresponding to the sixth horizontal section sec_6 from the second layer 620, and data corresponding to the seventh horizontal section sec_7 from the fourth layer 640. Similarly, data access for more layers and data access of other horizontal scan lines can be performed according to the above method.

Figure 7:
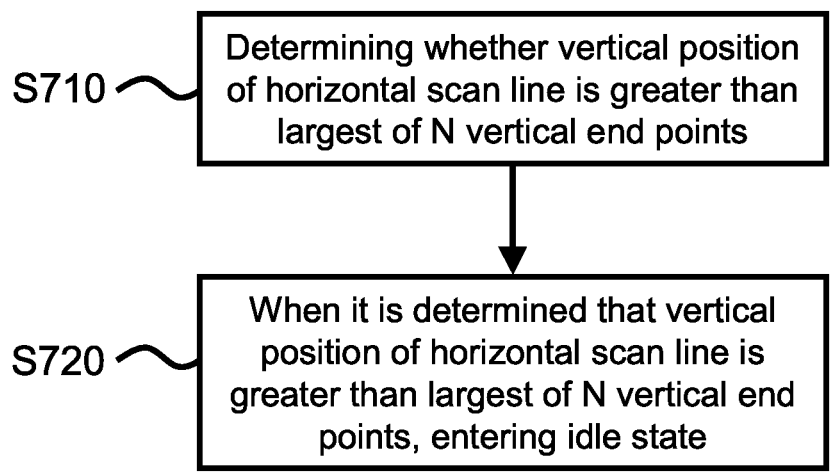
FIG. 7 is a schematic diagram of a variation of step S510 in FIG. 5b.

As previously stated, the vertical position of a horizontal scan line may fall outside of all the vertical layer intervals. To prevent redundant computations, as shown in FIG. 7, step S510 may include the following steps.

In step S710, it is determined whether the vertical position of the horizontal scan line is greater than a largest of the N vertical end points. For example, referring to FIG. 6, step S710 may compare and determine whether the vertical position y of the horizontal scan line h is greater than the largest vertical end point y_end_1 to determine whether the horizontal scan line h falls outside of all of the vertical layer intervals.

In step S720, when it is determined that the vertical position of the horizontal scan line is greater than the largest of the N vertical end points, an idle state is entered. For example, referring to FIG. 6, when it is determined that the vertical position y is greater than y_end_1, step S720 renders the data access device to temporarily enter an idle state.

Figure 5B:
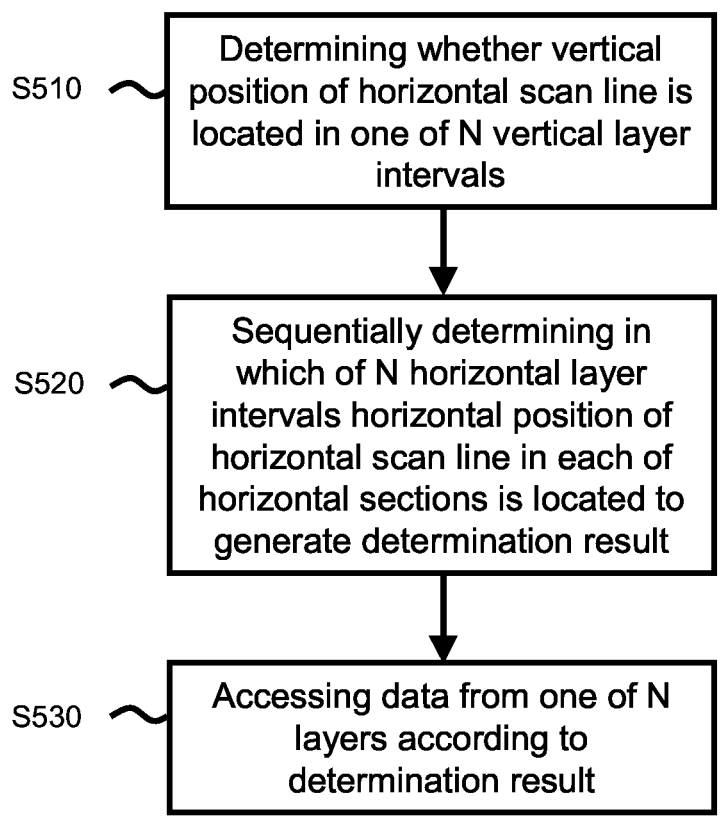
FIG. 5b is a schematic diagram of an example of step S52 in FIG. 5a according to an embodiment.
Figure 8:
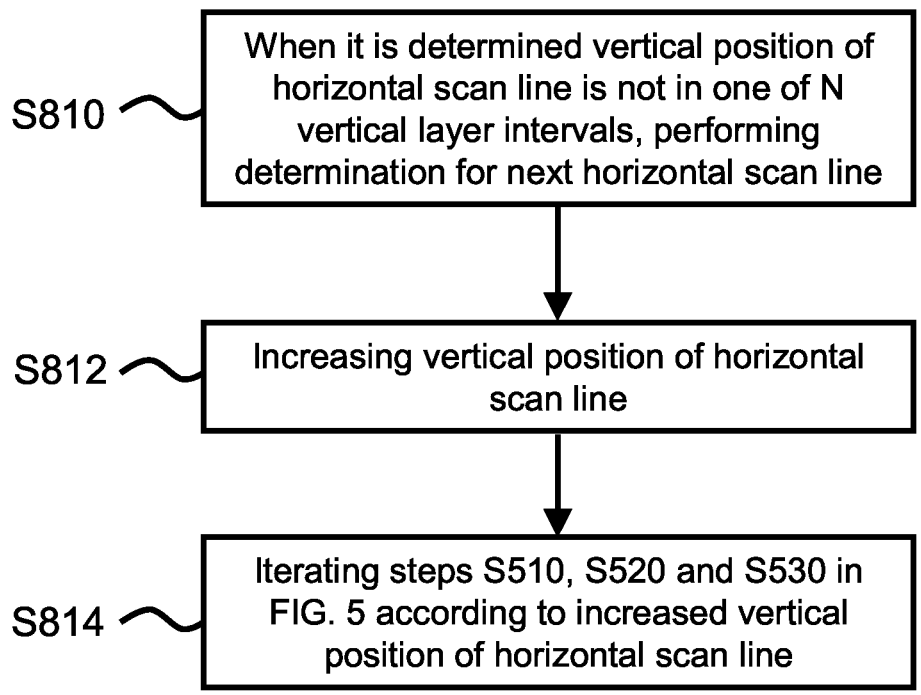
FIG. 8 is a schematic diagram of a variation of FIG. 5b according to an embodiment.

Further, in order to complete the determination for all of the horizontal scan lines (or horizontal scan lines that have vertical positions smaller than the largest vertical end point), as shown in FIG. 8, the embodiment in FIG. 5b may further include the following steps.

In step S810, when it is determined that the vertical position of the horizontal scan line is not located in one of the N vertical layer intervals, determination for a next horizontal scan line is performed. In the embodiment, step S810 includes steps S812 and S814. In step S812, the vertical position of the horizontal scan line is increased, e.g., adding the vertical position by one. In step S814, steps S510, S520 and S530 in FIG. 5b are iterated according to the increased vertical position of the horizontal scan line.

Figure 9:
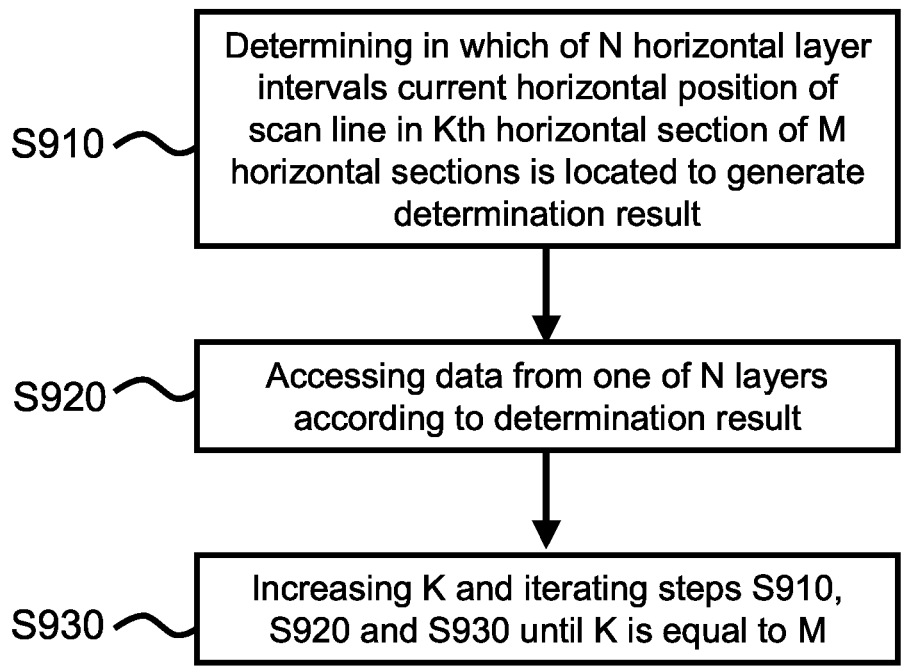
FIG. 9 is a schematic diagram of steps S520 and S530 in FIG. 5b according to an embodiment.

Referring to FIG. 9, to perform steps S520 and S530 in FIG. 5b according to the sequence of the M horizontal sections, steps S520 and S530 may include the following steps.

In step SS910, it is determined in which of the N horizontal layer intervals the current horizontal position of the horizontal scan line in a $K^{th}$ horizontal section of the M horizontal sections is located to generate the determination result, where K is a positive integer not greater than M. Taking FIG. 6 for example, when K is equal to four, step S910 determines that the current horizontal position x (e.g., the start point x_st_1 of the fourth horizontal section sec_4) of the horizontal scan line in the fourth horizontal section sec_4 satisfies the foregoing equation 1, it is then determined that the fourth horizontal section sec_4 corresponds to the first layer 610 to further generate the determination result.

In step S920, data of one of the N layers is accessed according to the determination result.

In step S930, K is increased, e.g., K is added by one, and steps S910, S920 and S930 are iterated until K is equal to M.

It should be noted that, as one layer may be superimposed on another layer, the layers in the foregoing embodiment determines a display sequence of overlapping parts according to a layer display priority sequence. For example, in FIG. 6, the layer display priority sequence is sequentially the first layer 610, the second layer 620, the third layer 630 and the fourth layer 640. To enhance computation efficiency, steps S510 and S520 in FIG. 5b may perform the comparisons according to the layer display priority sequence. For example, step S510 may perform the comparisons according to equations I, II, III and IV, and step S520 may perform the comparison according to equations 1, 2, 3, and 4. It should be noted that, the subsequent comparisons need not be performed if the equations are satisfied before performing the comparisons according to the sequence.

It should be noted that, the N layers in FIG. 5b may include one or multiple non-rectangular layers. Thus, before the steps in FIG. 5b, the layer access method of the present invention may further include the following steps (not shown).

In step S502, it is detected whether each of the layers is a rectangle to generate a detection result.

In step S504, when the detection result indicates that the N layers include Q non-rectangular layers, each of the non-rectangular layers is defined by utilizing a plurality of non-overlapping rectangular layers. Q is a positive integer. Each of the rectangular layers similarly includes a horizontal start point, a horizontal end point, a vertical start point and a vertical end point.

In step S506, when the total number of the rectangular layers is Z, N is updated to [(N−Q)+Z], where Z is a positive integer greater than 1. At this point, the number of the vertical layer intervals is equal to [(N−Q)+Z], the number of the horizontal layer intervals is equal to [(N−Q)+Z], and the number M of the horizontal sections is not greater than {2×[N−Q]+Z−1}. The steps in FIG. 5b are then performed.

Details for implementing steps S502, S504 and S506 can be thoroughly understood with reference to FIG. 4b and the associated description above by one person skilled in the art, and shall be omitted herein.

In another embodiment of the present invention, steps S50 and S52 may be realized by the following steps (not shown).

In step S54, a plurality of vertical sections (e.g., α vertical sections, where α is a positive integer not greater than (2×N−1)) are defined according to the N vertical start points and the N vertical end points, and a sorting procedure is performed according to a layer display priority sequence and one or multiple layers included in the range of each of the vertical sections to obtain a vertical sequence result for each of the vertical sections, where N is a positive integer.

In step S56, a plurality of horizontal sections (e.g., β horizontal sections, where β is a positive integer no greater than (2×N−1)) according to the N horizontal start points and the N horizontal end points, and a sorting procedure is performed according to the layer display priority sequence and one or multiple layers included in the range of each of the horizontal sections to obtain a horizontal sequence result for each of the horizontal sections. Further, the above plurality of vertical sections are for the data access device to determine whether the vertical position of a horizontal scan line is located in one of the plurality of vertical sections. When the vertical position of the horizontal scan line is located in one of the plurality of vertical sections, the vertical sequence result corresponding to the vertical section and the N horizontal sequence results are for the data access device to determine to which of the N layers the horizontal section in the vertical section corresponds, and for the data access device to access data from one of the N layers.

Figure 6:
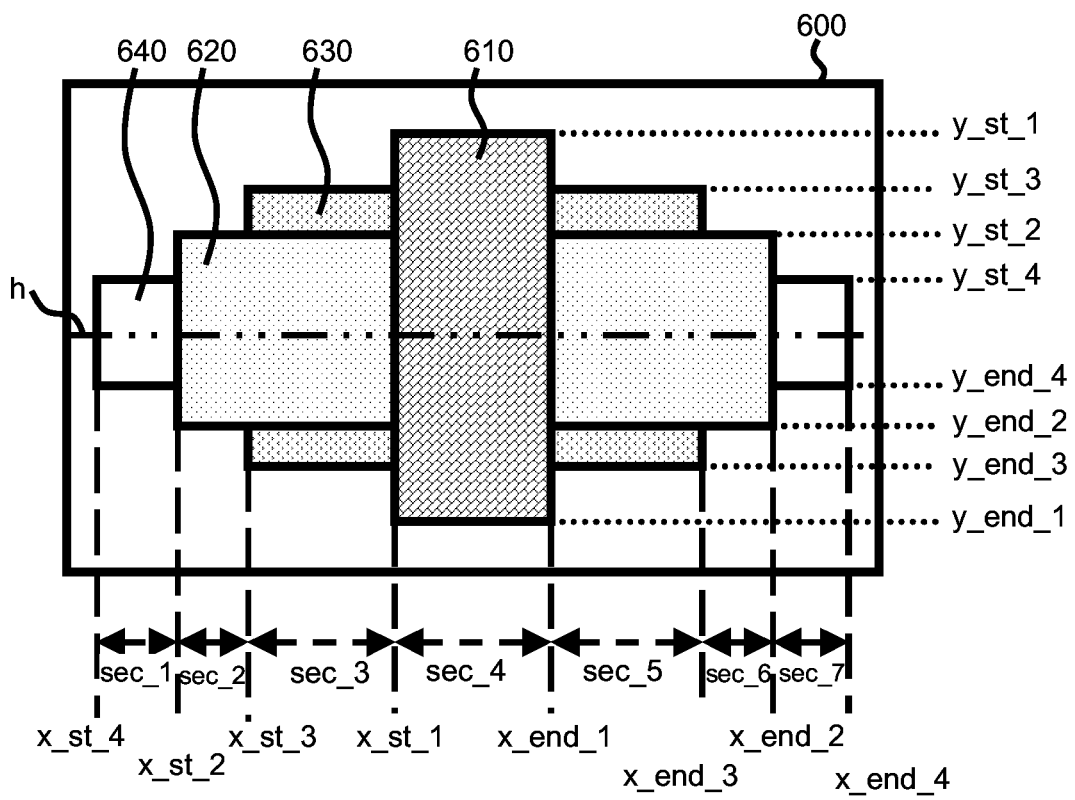
FIG. 6 is a schematic diagram of an application of FIG. 5b according to an embodiment.

For example, referring to FIG. 6, the four vertical start points and the four vertical end points in the diagram define a total of seven vertical sections. Among the seven vertical sections, the first vertical section (y_st_1 to y_st_3) corresponds to only the first layer 610, and thus the vertical sequence result of the vertical section can be represented by 1 (or represented by one or multiple binary bits in practice). At this point, the layers corresponding to the seven horizontal sections are sequentially the fourth layer 640 (represented by 4); the second layer 620 and the fourth layer 640 (represented by 24); the second layer 620, the third layer 630 and the fourth layer 640 (represented by 234); the first layer 610, the second layer 620, the third layer 630 and the fourth layer 640 (represented by 1234); the second layer 620, the third layer 630 and the fourth layer 640 (represented by 234); the second layer 620 and the fourth layer 640 (represented by 24); and the fourth layer 640 (represented by 4). By comparing the vertical sequence result of the first vertical section with the horizontal sequence result of each of the horizontal sections, it is learned that only the sequence result 1234 corresponding to the fourth horizontal section sec_4 and the sequence result 1 of the first vertical section include a matching value (i.e., both correspond to the first layer 610). Therefore, it is determined that the layers corresponding to the horizontal sections in the first vertical section are sequentially "no corresponding layer, no corresponding layer, no corresponding layer, the first layer 610, no corresponding layer, no corresponding layer, and no corresponding layer". Similarly, as the third vertical section (y_st_2 to y_st_4) corresponds to the first layer 610, the second layer 620 and the third layer 630, the vertical sequence result of the vertical section is 123, and the sequence result corresponding to the seven horizontal sections is still 4, 24, 1234, 234, 24, and 4. By comparing the two sequence results, it is determined that the layers corresponding to the horizontal sections in the third vertical sections are sequentially "no corresponding layer, 2, 2, 1, 2, 2, no corresponding layer". It should be noted that, when the comparison of the sequence results shows a plurality of matching values, the value with a highest display priority is selected. In the embodiment, the value represents the sequence, and a smallest value has a highest priority.

Figure 10:
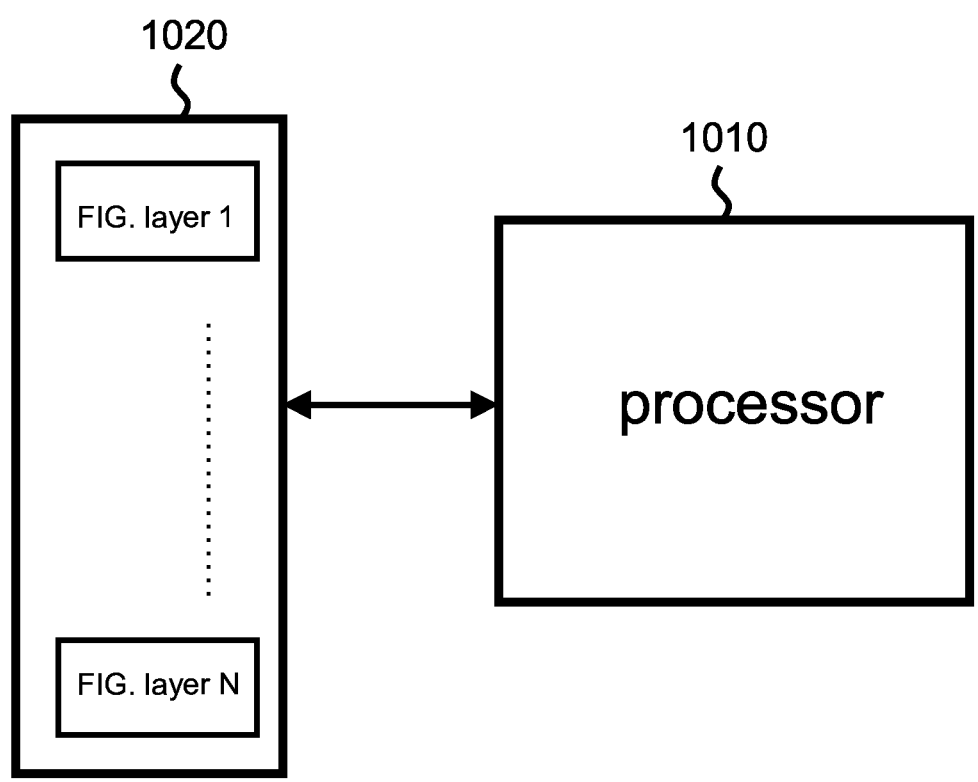
FIG. 10 is a schematic diagram of a data access device according to an embodiment of the present invention.

In addition to the foregoing layer access method, the present invention correspondingly discloses a data access device. The data access device is for accessing at least a part of N layers, which include a layer 1 to a layer N (where N is a positive integer) stored in a storage device. Definitions of start points, end points, vertical layer intervals, horizontal layer intervals and horizontal sections of the N layers are as previously described, and shall be omitted herein. Referring to FIG. 10, a data access device according to an embodiment includes a processor 1010 (e.g., a hardware circuit of a finite-state machine (FSM)), which is coupled to a storage device 1020 and configured to execute at least one step. The at least one step includes the foregoing steps S50 and S52. Such details can be referred from the foregoing description and shall be omitted herein.

As the N layers in FIG. 10 may include one or multiple non-rectangular layers, before performing the at least one step, the processor 1010 may perform steps S502, S504 and S506. Such details can be referred from the foregoing description and shall be omitted herein.

It should be noted that, operations of the data access device in FIG. 10 can be thoroughly understood and implemented with reference to FIGS. 3a to 9 and the associated description by one person skilled in the art, and shall be omitted herein. It is to be further noted that, the terms including horizontal, vertical, start points and end points in the disclosure are relative descriptions, and other terms corresponding to these relative descriptions are to be encompassed with the scope of the disclosure.

Therefore, the layer access arrangement method, the layer access method and the data access device of the present invention are capable of efficiently accessing required data from multiple layers. Thus, in addition to preventing bandwidth waste caused by loading non-necessary data, operation performance is enhanced while reducing implementation costs. In other words, by sectional data access, the present invention improves the issues of bandwidth waste and unsatisfactory operation efficiency of the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data access method, for a data access device to access data from N layers to display an image, N being a positive integer, each of the N layers comprising a horizontal start point, a horizontal end point, a vertical start point and a vertical end point, the method comprising:
   dividing the image into a plurality of regions according to the horizontal start points, the horizontal end points, the vertical start points and the vertical end points, wherein the regions respectively correspond to the layers; and
   accessing data from the respective layers corresponding to the regions when displaying the image,
   wherein the steps of dividing the image into the plurality of regions and accessing data from the respective layers corresponding to the regions comprise:
   defining a plurality of vertical sections according to the N vertical start points and the N vertical end points, and performing a sorting procedure according to a layer display priority sequence for one or a plurality of layers included in a range of each of the vertical sections to obtain a vertical sequence result for each of the vertical sections, where N is a positive integer; and
   defining a plurality of horizontal sections according to the N horizontal start points and the N horizontal end points, and performing a sorting procedure according to a layer display priority sequence and one or a plurality of layers included in a range of each of the horizontal sections to obtain a horizontal sequence result for each of the horizontal sections;
   wherein, the vertical sections are for the data access device to determine whether a vertical position of a horizontal scan line is located in one of the vertical sections; when the vertical position of the scan line is located in one of the vertical sections, the vertical sequence result corresponding to the vertical section and the N horizontal sequence results are for the data access device to determine to which of the N layers the horizontal section in the vertical section corresponds, and are for the data access device to accordingly access data from one of the N layers.

2. The data access method according to claim 1, wherein the step of accessing data from the respective layers corresponding to the regions when displaying the image comprises:
   determining in which of the regions a section of a scan line is located, and accordingly accessing data from the layer corresponding to the region.

3. The data access method according to claim 2, wherein the scan line is a horizontal scan line, and the step of determining in which of the regions the section of the scan line is located comprises:
   sorting the N horizontal start points and the N horizontal end points to obtain M horizontal sections, wherein M is a positive integer not greater than (2×N−1), the section of the scan line corresponds to one of the M horizontal sections, and the horizontal sections respectively correspond to the regions; and determining to which of the M horizontal sections the section of the scan line corresponds to determine in which of the regions the section of the scan line is located.

4. The data access method according to claim 2, wherein the scan line is a horizontal scan line, the data access method further comprising:

a) before the step of determining in which of the regions the section of the scan line is located and accordingly accessing data from the layer corresponding to the region, defining N vertical layer intervals according to the N vertical start points and the N vertical end points, wherein the vertical layer intervals respectively correspond to the N layers; and b) determining whether a vertical position of the scan line is located in one of the N vertical layer intervals, and when the vertical position of the scan line is located in one of the N vertical layer intervals, determining in which of the regions the section of the scan line is located and accordingly accessing data from the layer corresponding to the region.

5. The data access method according to claim 4, wherein step (b) further comprises:

when the vertical position of the scan line is not in one of the N vertical layer intervals, utilizing a next horizontal scan line as the scan line and iterating step (b).

6. The data access method according to claim 1, wherein the N vertical start points and the N vertical end points define N vertical layer intervals, the N horizontal start points and the N horizontal end points define N horizontal layer intervals and M horizontal sections, N and M are positive integers, M is not greater than (2×N−1), and the step of accessing data from the respective layers corresponding to the regions when displaying the image comprises:

determining whether a vertical position of a horizontal scan line is located in one of the N vertical layer intervals, wherein the vertical layer intervals respectively correspond to the N layers;

when it is determined that the vertical position of the horizontal scan line is in one of the N vertical layer intervals, determining in which of the N horizontal layer intervals a horizontal position of the horizontal scan line in each of the horizontal sections is located according to a sequence of the M horizontal sections to generate a determination result, wherein the horizontal layer intervals respectively correspond to the N layers; and accessing data from one of the N layers according to the determination result.

7. The data access method according to claim 6, wherein the step of determining whether the vertical position of the horizontal scan line is located in one of the N vertical layer intervals comprises:

determining whether the vertical position of the horizontal scan line is greater than a largest of the N vertical end points; and when it is determined that the vertical position of the horizontal scan line is greater than the largest of the N vertical end points, entering an idle state.

8. The data access method according to claim 6, wherein the step of generating the determination result and accessing data from one of the N layers according to the determination result comprises:

step a) determining in which of the N horizontal layer intervals the horizontal position of the horizontal scan line in a $K^{th}$ horizontal section of the M horizontal sections is located to generate the determination result, where K is a positive integer not greater than M;

step b) accessing data from one of the N layers according to the determination result; and step c) increasing K, and performing step (a) and step (b) according to the increased K until the increased K is equal to M.

9. A data access device, for accessing data from N layers to display an image, N being a positive integer, the N layers stored in a storage device, each of the N layer comprising a horizontal start point, a horizontal end point, a vertical start point and a vertical end point, the device comprising:

a processor, configured to perform a plurality of steps, the steps comprising:

dividing the image into a plurality of regions according to the N horizontal start points, the N horizontal end points, the N vertical start points and the N vertical end points, wherein the regions respectively correspond to the layers; and accessing data from the respective layers corresponding to the regions when displaying the image, wherein the steps of dividing the image into the plurality of regions and accessing data from the respective layers corresponding to the regions comprise:

defining a plurality of vertical sections according to the N vertical start points and the N vertical end points, and performing a sorting procedure according to a layer display priority sequence for one or a plurality of layers included in a range of each of the vertical sections to obtain a vertical sequence result for each of the vertical sections, where N is a positive integer; and defining a plurality of horizontal sections according to the N horizontal start points and the N horizontal end points, and performing a sorting procedure according to a layer display priority sequence and one or a plurality of layers included in a range of each of the horizontal sections to obtain a horizontal sequence result for each of the horizontal sections;

wherein, the vertical sections are for the data access device to determine whether a vertical position of a horizontal scan line is located in one of the vertical sections; when the vertical position of the scan line is located in one of the vertical sections, the vertical sequence result corresponding to the vertical section and the N horizontal sequence results are for the data access device to determine to which of the N layers the horizontal section in the vertical section corresponds, and are for the data access device to accordingly access data from one of the N layers.

10. The data access device according to claim 9, wherein the processor determines in which of the regions a section of a scan line is located, and accordingly accesses data from the layer corresponding to the region.

11. The data access device according to claim 10, wherein the processor sorts the N horizontal start points and the N horizontal end points to obtain M horizontal sections, and determines to which of the M horizontal sections the section of the scan line corresponds to determine in which of the regions the section of the scan line is located, M is a positive integer not greater than (2×N−1), the section of the scan line corresponds to one of the M horizontal sections, and the horizontal sections respectively correspond to the regions.

12. The data access device according to claim 10, wherein the scan line is a horizontal scan line, and the steps further comprise:
- a) before the processor determines in which of the regions the section of the scan line is located and accordingly accesses data from the layer corresponding to the region, defining N vertical layer intervals according to the N vertical start points and the N vertical end points, wherein the vertical layer intervals respectively correspond to the N layers; and
- b) the processor determining whether a vertical position of the scan line is located in one of the N vertical layer intervals; when the vertical position of the scan line is located in one of the N vertical layer intervals, the processor determining in which of the regions the section of the scan line is located and accordingly accessing data from the layer corresponding to the region.

13. The data access device according to claim 12, wherein step (b) further comprises:
when the vertical position of the scan line is not in one of the N vertical layer intervals, the processor utilizing a next horizontal scan line as the scan line and iterating step (b).

14. The data access device according to claim 9, wherein the N vertical start points and the N vertical end points define N vertical layer intervals, the N horizontal start points and the N horizontal end points define N horizontal layer intervals and M horizontal sections, N and M are positive integers, M is not greater than (2×N−1), and the step of the processor accessing data from the respective layers corresponding to the regions when displaying the image comprises:
determining whether a vertical position of a horizontal scan line is located in one of the N vertical layer intervals, wherein the vertical layer intervals respectively correspond to the N layers;

when it is determined that the vertical position of the horizontal scan line is in one of the N vertical layer intervals, determining in which of the N horizontal layer intervals a horizontal position of a horizontal scan line in each of the horizontal sections is located according to a sequence of the M horizontal sections to generate a determination result, wherein the horizontal layer intervals respectively correspond to the N layers; and accessing data from one of the N layers according to the determination result.

15. The data access device according to claim 14, wherein the step of the processor determining whether the vertical position of the horizontal scan line is located in one of the N vertical layer intervals comprises:
determining whether the vertical position of the horizontal scan line is greater than a largest of the N vertical end points; and
when it is determined that the vertical position of the horizontal scan line is greater than the largest of the N vertical end points, entering an idle state.

16. The data access device according to claim 14, wherein the step of the processor generating the determination result comprises:
- step a) determining in which of the N horizontal layer intervals the horizontal position of the horizontal scan line in a $K^{th}$ horizontal section of the M horizontal sections is located to generate the determination result, where K is a positive integer not greater than M;
- step b) accessing data from one of the N layers according to the determination result; and
- step c) increasing K, and performing step (a) and step (b) according to the increased K until the increased K is equal to M.

* * * * *